United States Patent
Engelhardt

[19]

[11] Patent Number: 5,886,784
[45] Date of Patent: Mar. 23, 1999

[54] DEVICE FOR THE SELECTION AND DETECTION OF AT LEAST TWO SPECTRAL REGIONS IN A BEAM OF LIGHT

[75] Inventor: Johann Engelhardt, Bad Schoenborn, Germany

[73] Assignee: Leica Lasertechink GmbH, Heidelberg, Germany

[21] Appl. No.: 910,173

[22] Filed: Aug. 13, 1997

Related U.S. Application Data

[63] Continuation of Ser. No. 605,067, filed as PCT/DE94/01019 Sep. 6, 1994, abandoned.

[30] Foreign Application Priority Data

Sep. 8, 1993 [DE] Germany .................... 43 303 47.1

[51] Int. Cl.[6] .................................................. G01J 3/28
[52] U.S. Cl. ............................................................ 356/326
[58] Field of Search .................................. 356/317, 318, 356/301, 419, 73, 402–411, 326, 328, 300, 445–448, 332, 310; 250/339.11

[56] References Cited

U.S. PATENT DOCUMENTS

| | | | |
|---|---|---|---|
| 3,797,942 | 3/1974 | Joly | 356/419 |
| 4,615,619 | 10/1986 | Fateley . | |
| 5,216,479 | 6/1993 | Dotan et al. | 356/445 |
| 5,225,893 | 7/1993 | Whitney et al. | 356/407 |
| 5,424,825 | 6/1995 | Delhaye et al. | 356/301 |

FOREIGN PATENT DOCUMENTS

WO 92/18850  10/1992  WIPO .

OTHER PUBLICATIONS

Busch et al., "Multielement Detection Systems for Spectrochemical Analysis," 1990, pp. 192–195.

Bowron et al., "A New Spectrally Resolved Confocal Scanning Laser Microscope," Proceedings of Scanning, vol. 13, Supplement 1, 1991, pp. 1–76–1–77.

*Primary Examiner*—K. P. Hantis
*Attorney, Agent, or Firm*—Foley & Lardner

[57] ABSTRACT

Described is a device (16) for the selection and detection of at least two spectral regions in a beam of light (14), the device including a selection unit (25) and a detection unit (26). To ensure reliable simultaneous selection and detection of different spectral regions plus high yield and simplest possible construction, the device is designed such that the selection unit (25) comprises means (27) for splitting the light beam (14) up into its spectral components and means (28) for not only masking off a first spectral region (29) but also reflecting at least part (30) of the spectral region which is not masked off, and the detection unit (26) comprises a first detector (31) located in the path of the light in the masked-off first spectral region (29) and a second detector (32) located in the path of the light of the reflected spectral region (30).

46 Claims, 5 Drawing Sheets

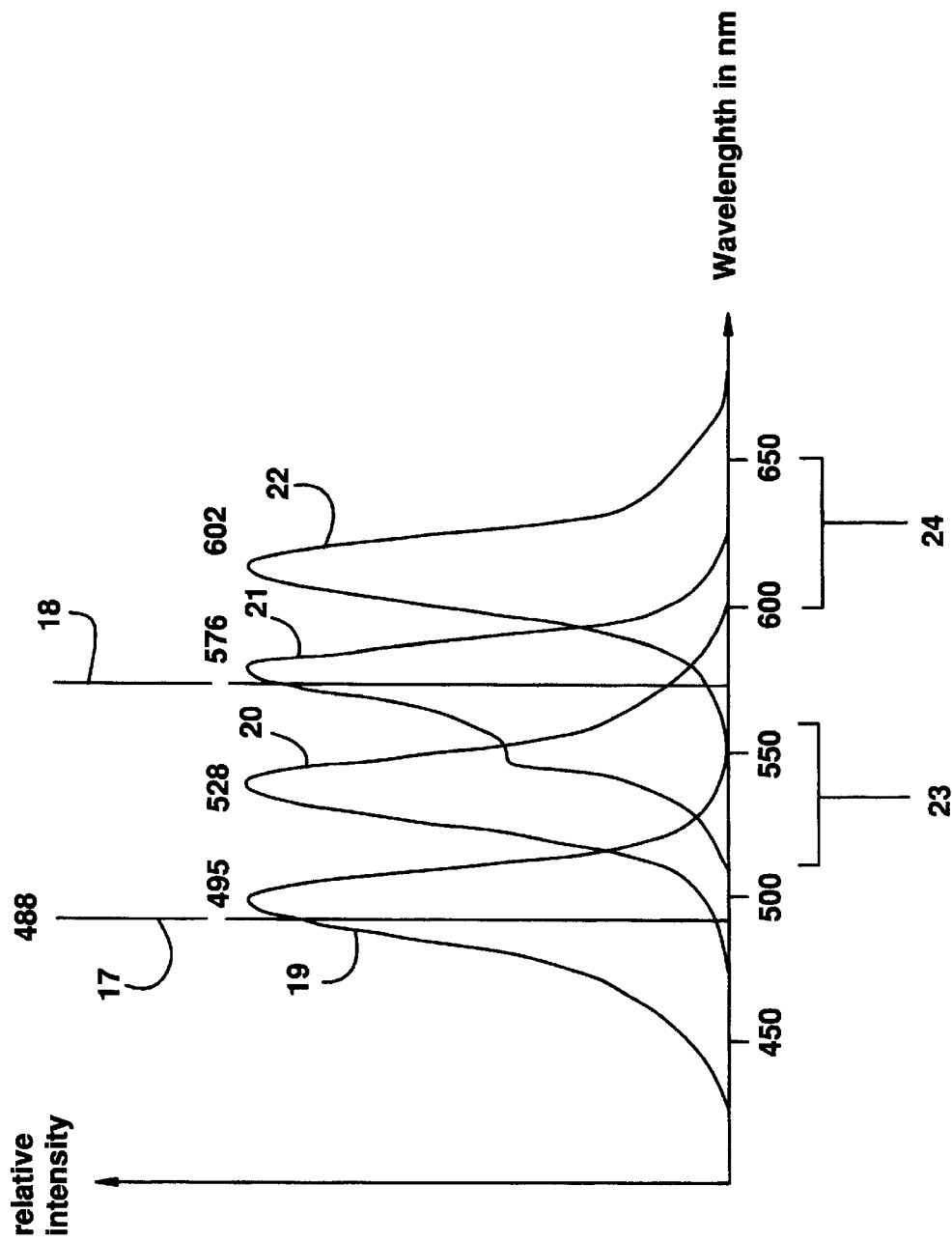

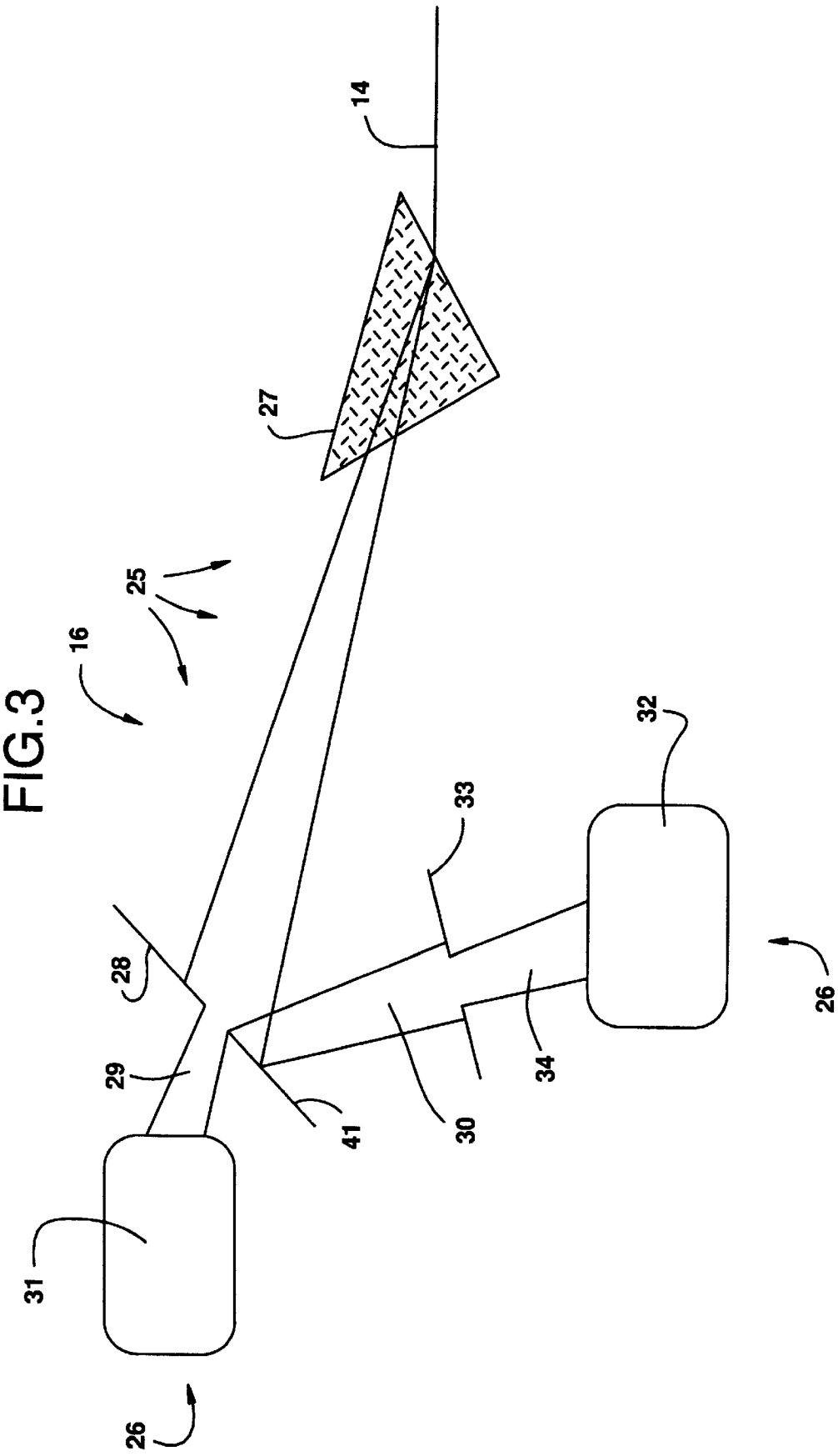

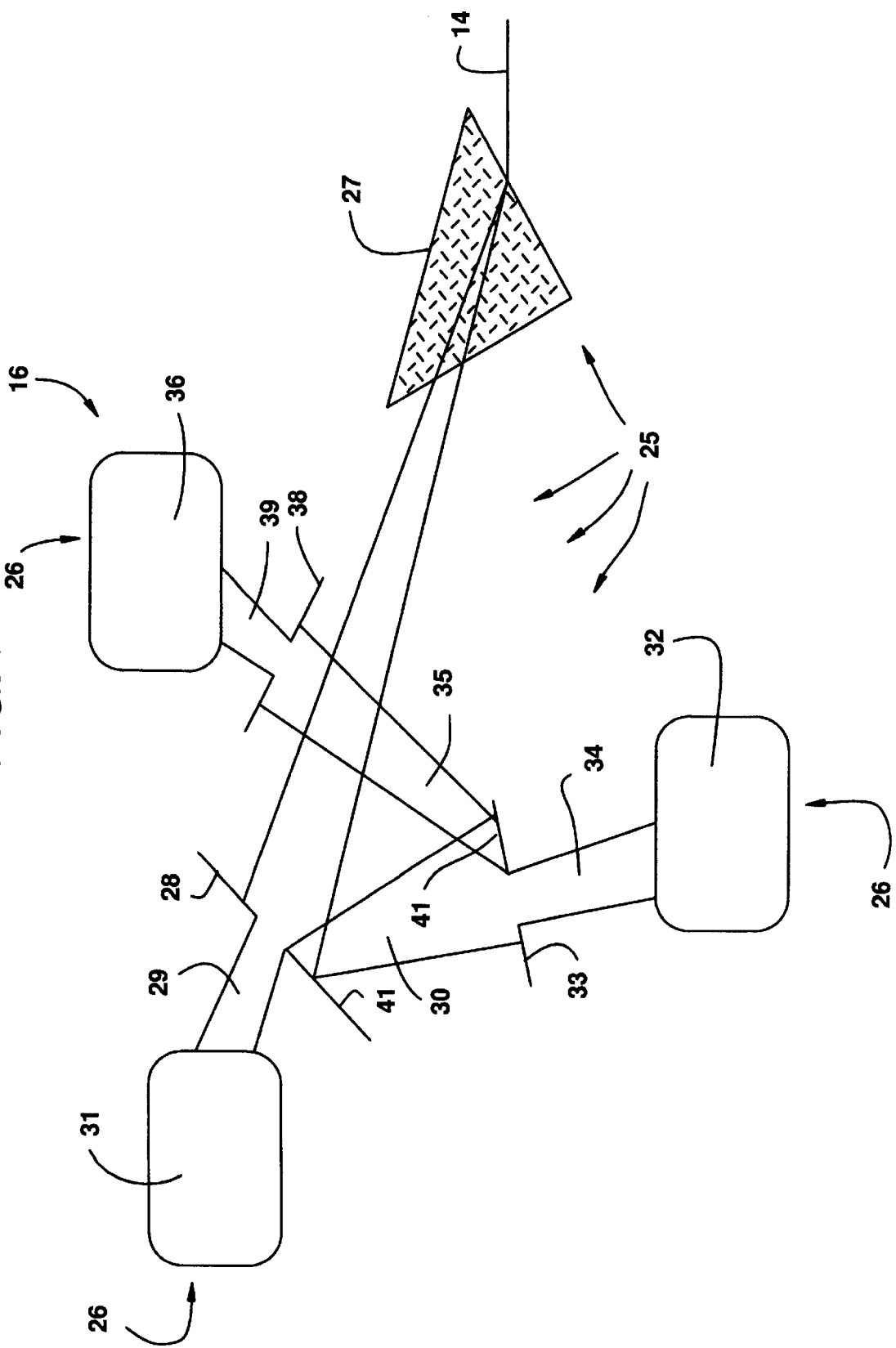

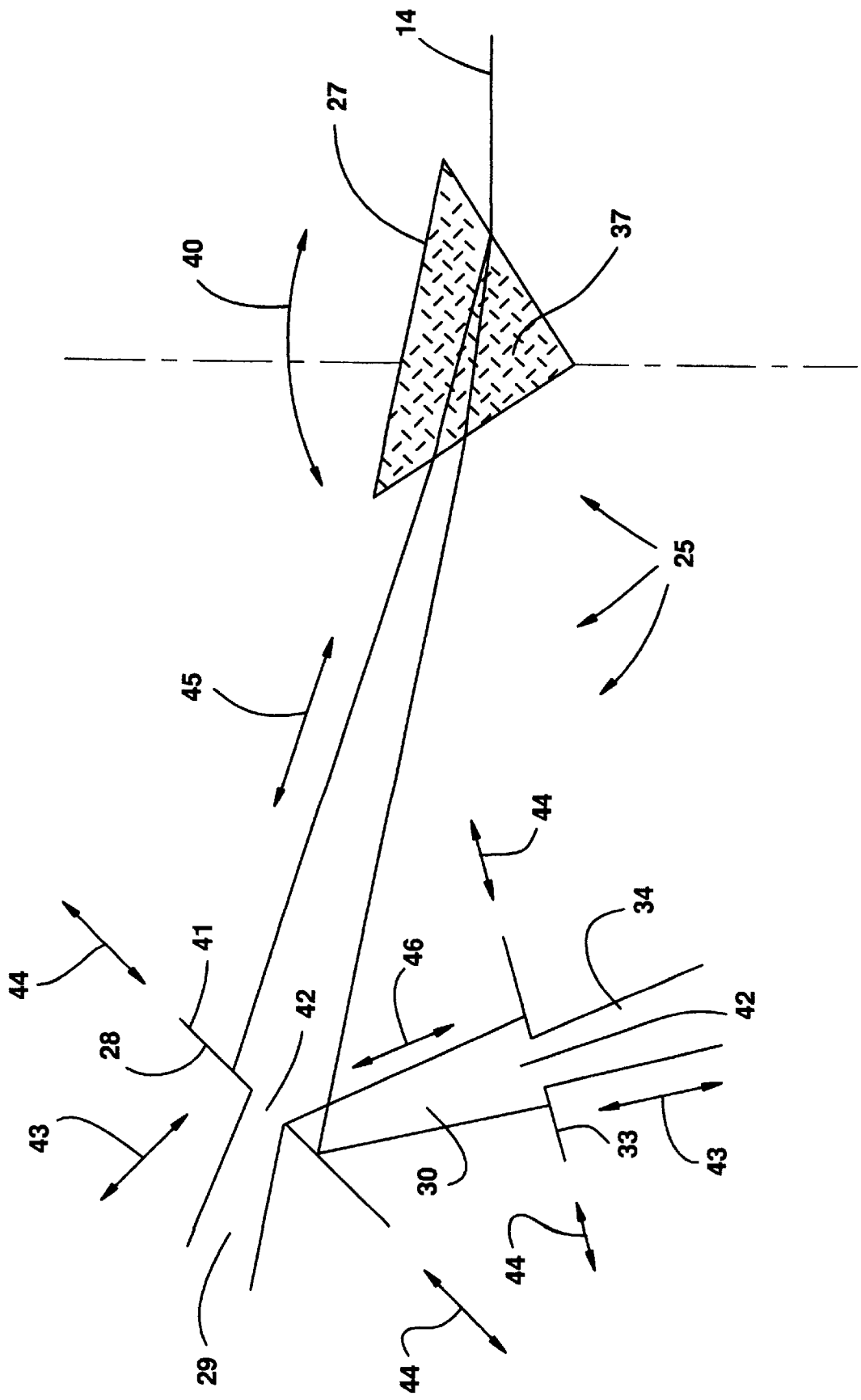

DEVICE FOR THE SELECTION AND DETECTION OF AT LEAST TWO SPECTRAL REGIONS IN A BEAM OF LIGHT

This application is a continuation of application Ser. No. 08/605,067, filed Mar. 7, 1996, now abandoned, which is the National Stage application of PCT/DE94/01019, filed Sep. 6, 1994.

BACKGROUND

The invention relates to a device for the selection and detection of at least two spectral regions in a beam of light, having a selection device and a detection device. In particular, the present invention relates to a device of the type under discussion which is suitable for use in confocal fluorescence microscopy.

"Proceedings of Scanning, Vol. 13, Supplement I, 1991, pages I-76 and I-77" to be found in the literature disclosed a confocal fluorescence microscope which can be used to detect the spectral region of a dye. A beam of light generated by a laser is guided with the aid of optical units to an object to be microscoped and reflected from the latter, or excites fluorescent materials there. The reflected or fluorescent beam of light is coupled out by means of a beam splitter and fed to a detector via an optical filter. The filter fulfills the task of cutting out the spectral region of the dye. If the relevant dye is contained in the object to be microscoped, it is detected by the detector due to the high intensity. Consequently, it is possible in this way in the case of a biomedical application, for example, to detect dyed cells or cell structures in an object.

It is also already known to use the previously described microscoping technique over a wider scope. Thus, for example, different cell constituents are dyed simultaneously with two or more dyes, in order to be able to determine or investigate the spatial correlation of the cell constituents. However, it is necessary in the framework of this application to cut out, or select the different spectral regions of the respective dyes from the total reflected beam of light. For this purpose, use has been made to date of beam splitters and optical filters which are exactly tuned to the respective spectral region. Each cut-out beam of light is then fed in a way known per se to a detector provided specially for the purpose.

The previously dressed device, from which the invention present here proceeds, which serves to select and detect at least two spectral regions in a beam of light has the very substantial disadvantage that a separate filter is required for each dye. With regard, in particular, to the possibility of detecting different dyes or dye combinations, the consequence of this is that a multiplicity of filters must be provided as dictated by the system. A further disadvantage of the known device is to be seen in that the intensity of the beam of light reflected from the object is reduced by the filters. The consequence of this, in turn, is that increased optical and, if appropriate, electronic demands have to be placed on the detectors for reliable selection and detection of spectral regions.

SUMMARY OF INVENTION

It is therefore an object of the invention to specify a device for the selection and detection of at least two spectral regions in a beam of light which is suitable, in conjunction with a sample design, for the reliable selection and detection of different spectral regions. The selection and detection of the different spectral regions is to be performed simultaneously and with high efficiency.

A device according to the invention for the selection and detection of at least two spectral regions in a beam of light achieves the preceding object by means of the features of described below. (TAB) A device of the type under discussion is constructed in such a way that the selection device comprises means for spectral decomposition of the beam of light and means for cutting out (or deflecting) a first spectral region, on the one hand, and for reflecting at least a part of the spectral region not cut out, on the other hand, and the detection device comprises a first detector, arranged in the beam path of the cut-out, first spectral region, and a second detector arranged in the beam path of the reflected spectral region.

In the technique of the invention, a first spectral region is cut out from the spectrally decomposed beam of light. The spectral region not cut out is—simultaneously—reflected at least partly. Both the cut-out, first spectral region and the spectral region reflected here are detected by means of a respective detector, specifically by arranging the detectors in the respective beam path. In the technique of the invention, the combination of cutting out a first spectral region and reflecting the spectral region not cut out leads to a sharp separation and thus to individual detection of the spectral regions thus separated from one another. There is therefore no need for filters tuned to the respective spectral regions.

As already described above, a first spectral region is cut out from the spectrally decomposed beam of light, and the spectral region not cut out is reflected. The means used for cutting out are designed in this case such that the cut-out, first spectral region corresponds exactly to the spectral region to be detected here. The same holds for the reflected spectral region which can be defined by a particular configuration of the reflecting surface. Within the scope of a particularly advantageous refinement, this reflected spectral region can be cut out to the extent of a second—defined—spectral region by means arranged in the beam path of the reflected spectral region. The second detector would then be arranged in the beam path of the cut-out, second spectral region, there also again being the possibility here of a selection—by the second detector itself.

If selection and detection of further spectral regions are necessary, the means for cutting out the second spectral region could—as in the case of the means for cutting out the first spectral region—comprise arrangements for reflecting at least a part of the spectral region not cut out here. Here, as well, the second detector would be arranged in the beam path of the cut-out, second spectral region. A third detector would then be arranged in the beam path of the now further reflected spectral region, with the result that a total of three spectral regions can be detected. It is also possible to provide means for cutting out the third spectral region in the beam path of the further reflected spectral region, with the result that the third detector is then arranged in the beam path of the cut-out, third spectral region. The previously named arrangement, specifically the arrangement of means for cutting out and reflecting a plurality of spectral regions, as well as detectors, can also be combined in cascaded form, with the result that the spectral region respectively cut out can be detected, and the respectively reflected spectral region can be cut out once again, if appropriate, and likewise detected.

With regard to a particularly compact refinement of the device according to the invention, it is particularly advantageous if the means used for cutting out and, if appropriate, for reflecting and the respectively associated detector are designed as an integral assembly. Cascading would here require the combination of corresponding assemblies, which are to be tuned to one another only with regard to their arrangement and dimensioning.

With regard to a definite refinement of the device according to the invention, it is advantageous with respect to a simple design if the means for spectral decomposition of the beam of light are designed as a prism. Likewise, an optical grating or even a hologram could be employed. It is important that spectral decomposition of the incident beam of light takes place so that a divergent beam of light is available.

In order to influence the spectral regions which are to be selected and, finally, detected, the prism or the grating or the hologram could be designed such that it can be pivoted about an axis preferably extending orthogonally relative to the incident beam of light. To this extent, it would be simple to influence the spectral region in the case of fixed means for cutting-out.

The means for cutting out a spectral region could be designed as a diaphragm, preferably as a slit diaphragm. These means, on the one hand, for cutting out a spectral region and, on the other hand, for reflecting at least a part of the spectral region not cut out, could employ a reflector diaphragm which has a preferably totally reflecting coating, or a mirror, on at least one of its surfaces facing the incident light. Both the slit of a slit diaphragm and the reflecting surface or the reflecting surfaces could be variable in position and/or angular position, for which purpose these variations could preferably be performed continuously, that is to say without steps, via a motor drive. As a supplement to the adjustability of the prism previously named by way of example, it is also possible to set or prescribe the spectral region to be selected, it being possible for the spectral region of interest to be prescribed or set with particular accuracy by the combined settability, on the one hand, of the means for spectral decomposition and, on the other hand, the means for cutting out and reflecting.

In order to avoid influences due to scattered light or to suppress the primary exciting light, the means for cutting out a spectral region and, if appropriate, for reflecting at least a part of the spectral region not cut out could advantageously have further means for cutting out spectral lines. These could preferably be so-called light traps, in this case. These means for cutting out spectral lines could be designed as non-reflecting regions or light-absorbing regions, it being possible here, quite simply, for these to be blind holes in which the incident light "peters out" after multiple reflection. These special means used to cut out spectral lines could, in turn, be designed as integral components of the means used to cut out the spectral regions to be detected.

Furthermore, the non-reflecting regions used as light traps could be variable in position and/or angular position, with the result that an exact settability is also provided to that extent. The variation could preferably be performed continuously via a motor drive, with the result that specific scattered-light conditions can be compensated.

The means for reducing scattered light could be arranged in principle in the different beam paths of the cut out and/or reflected spectral regions, with the result that disturbing influences caused by scattered light are avoided to the greatest possible extent.

With regard to an exact tuning of the device according to the invention, it is advantageous if the means for spectral decomposition of the beam of light and the means for cutting out a spectral region and, if appropriate, for reflecting at least a part of the spectral region not cut out can be varied in angular position and/or position relative to one another. To this extent, an exact tuning could be performed in order to stipulate the spectral region to be detected. In addition, it is possible for the different means for cutting out a spectral region and, if appropriate, for reflecting at least a part of the spectral region not cut out to be variable amongst or relative to one another in angular position and/or position relative to one another. Consequently, to this extent it is possible for the different "cut-out stages" to be set exactly. Finally, in their position relative to the means for cutting out a spectral region and, if appropriate, for reflecting at least a part of the spectral region not cut out, it is possible for the detectors to be variable in angular position and/or position relative to one another. To this extent, also, the spectral regions cut out and to be detected could be influenced or prescribed once again, it being possible for all previously named variations in angular positions and/or positions preferably to be performed via a motor drive.

Finally, it may be quite particularly emphasized that the device according to the invention as discussed above can be inserted in the beam path of a confocal fluorescence microscope, the device being connected downstream of the actual fluorescence microscope for the purpose of recording the beam of light or beam of fluorescent light reflected there.

There are now various possibilities for configuring and developing the teachings of the present invention in an advantageous way. Reference may be made for this purpose, to the following explanation of three exemplary embodiments of the invention with the aid of the drawings. In conjunction with the explanation of the preferred exemplary embodiments of the invention with the aid of the drawings, an explanation is also given of generally preferred refinements and developments of the teaching.

BRIEF DESCRIPTIONS OF THE DRAWINGS

FIG. 1 shows a schematic block diagram of a confocal fluorescence microscope having a device according to the invention, FIG. 2 shows a diagram of a coordinate system which plots the wavelength and the intensity of a beam of light and in which the spectra of two dyes are represented, FIG. 3 shows a schematic block diagram of a first exemplary embodiment of a device according to the invention for the selection and detection of two spectral regions in a beam of light, FIG. 4 shows a schematic block diagram of a second exemplary embodiment of a device according to the invention for the selection and detection of three spectral regions in a beam of light, and FIG. 5 shows a schematic block diagram of a third exemplary embodiment of a device according to the invention, but with an adjustable selection device.

DETAILED DESCRIPTION OF EMBODIMENTS

Figure 1:
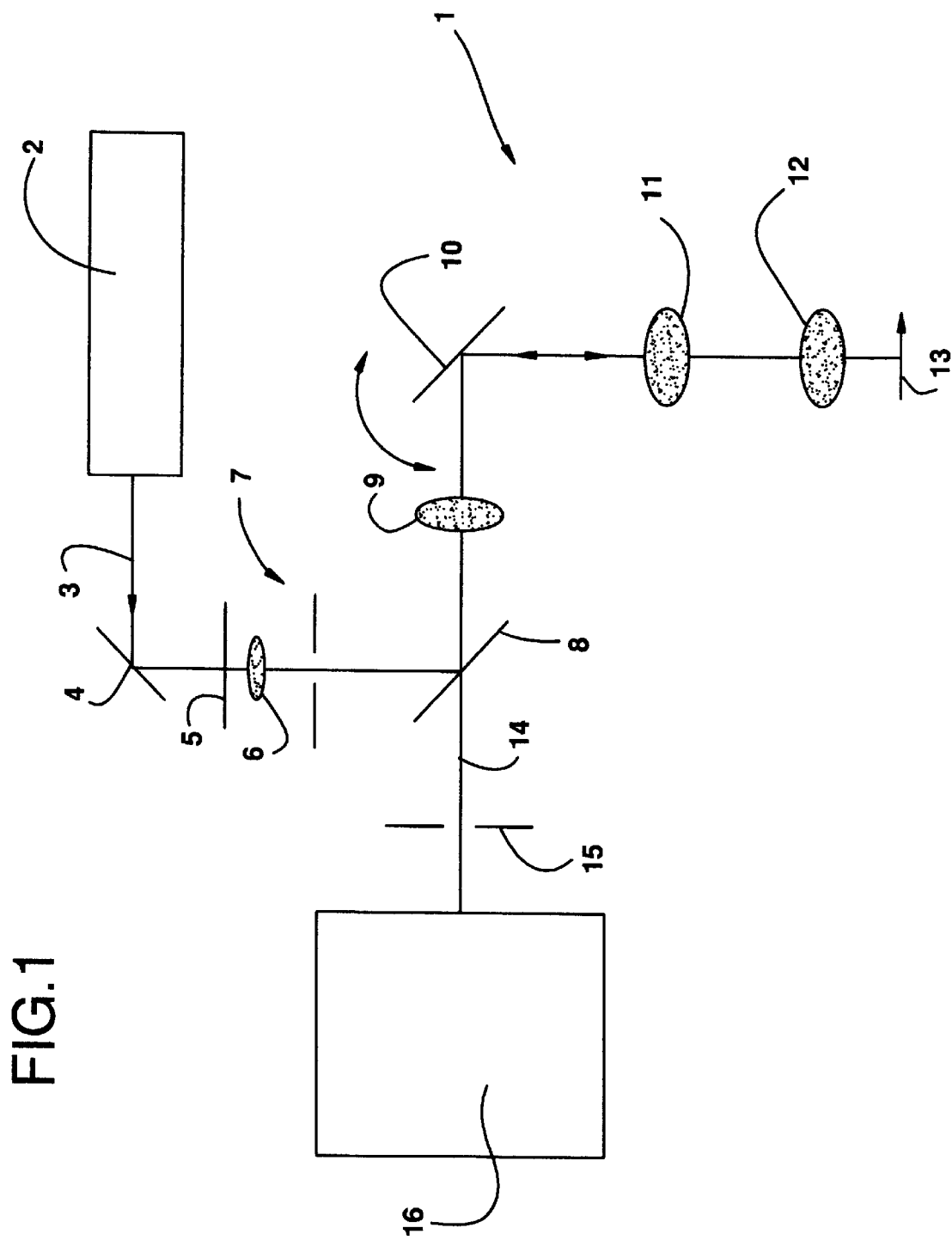

FIG. 1 shows a schematic block diagram of the basic design of a confocal fluorescence microscope 1, in which a beam of light 3 is generated by a laser 2. The beam of light 3 is fed to a beam splitter 8 via a deflecting mirror 4, an exciter filter 5, a lens 6 and a diaphragm 7. The beam of light 3 is deflected from the beam splitter by approximately 90° and passes to the object 13 to be microscoped via a further lens 9, a pivotable scanning mirror 10, an eyepiece 11 and an objective 12. The object 13 reflects at least a part of the beam of light 3 incident there. The reflected beam of light 14 traverses the objective 12, the eyepiece 11, the scanning mirror 10 and the lens 9 back to the beam splitter 8. There, the reflected beam of light 14 is transmitted rectilinearly and passes via a diaphragm 15 to the device 16 according to the invention, in which the beam of light 14 is processed further optically.

FIG. 2 shows the spectra of two dyes in a coordinate system. Plotted in nanometers (nm) on the abscissa is the wavelength of the light, and the relative intensity of the light is plotted on the ordinate.

If the laser 2 is, for example, an argon-krypton mixed-gas laser, the latter especially emits an argon line 17 at 488 nm and a krypton line 18 at 568 nm. If, furthermore, constituents of the object 13 are dyed selectively with the dye FITC (fluorescein isothiocyanate) and the dye lissamine-rhodamine, the dye FITC is excited by the argon line 17 and the dye lissamine-rhodamine is excited by the krypton line 18. In conjunction with the dye FITC, these excitation means effect an absorption 19 in the region of approximately 495 nm and an emission 20 in the region of 528 nm. In the case of the dye lissamine-rhodamine, there is an absorption 21 in the region of approximately 574 nm and an emission 22 in the region of approximately 602 nm.

If the differently dyed constituents of the object 13 are to be detected during microscoping, it is necessary to detect the emissions 20 and 22 of the dyes FITC and lissamine-rhodamine. Consequently, the FITC spectral region 23 and the lissamine-rhodamine spectral region 24 of the emissions 20 and 22 are to be detected. In the case of the fluorescence microscope 1 represented in FIG. 1, this is performed with the aid of the device 16 according to the invention for the selection and detection of different spectral regions.

FIG. 3 now shows a first exemplary embodiment of a device 16 according to the invention for the detection of two spectral regions in a beam of light 14, having a selection device 25 and a detection device 26.

In the technique of to the invention, the selection device 25 has means 27 for the spectral decomposition of the beam of light 14 and means 28 for, on the one hand, cutting out, or selecting a first spectral region 29 and, on the other hand, reflecting at least a part 30 of the spectral region not cut out, and the detection device 26 has a first detector 31, arranged in the beam path of the cut-out, first spectral region 29, and a second detector 32, arranged in the beam path of the reflected spectral region.

Furthermore, FIG. 3 shows clearly that the selection device 25 comprises means 33, arranged in the beam path of the reflected spectral region 30, for cutting out a second spectral region 34, and that the second detector 32 is arranged in the beam path of the cut-out, second spectral region 34.

In the second exemplary embodiment, represented in FIG. 4, of a device 16 according to the invention, the selection device 25 has means 33, arranged in the beam path of the reflected spectral region 30, for, on the one hand, cutting out a second spectral region 34 and, on the other hand, for further reflection of at least a part 35 of the spectral region not cut out here. The second detector 32 is arranged in the beam path of the cut-out, second spectral region 34, and a third detector 36 is arranged in the beam path of the further reflected spectral region 35.

The selection device 25 of the exemplary embodiment, represented in FIG. 4, of the device 16 according to the invention further comprises means 38, arranged in the beam path of the further reflected spectral region 35, for cutting out a third spectral region 39, the third detector 36 being arranged in the beam path of the cut-out, third spectral region 39. Consequently, a total of three spectral regions 29, 34 and 39 are selected and detected using the exemplary embodiment represented here. In accordance with the statements in the summary, it is possible to cascade means for cutting out a plurality of spectral regions and reflecting, as well as detectors, with the result that it is directly possible even for more than three spectral regions to be selected and detected simultaneously.

In the exemplary embodiments represented in FIGS. 3, 4 and 5, the means 27 for spectral decomposition of the beam of light 14 are designed as a prism, it being the case that in the third exemplary embodiment represented in FIG. 5 the prism can be pivoted in accordance with the arrow 40 in FIG. 5 about an axis 37 extending orthogonally relative to the incident light beam 14 and to the plane of the drawing. The means 28, 33 and 38 are respectively designed as a slit diaphragm, a totally reflecting coating 41 being respectively provided on a surface facing the incident light for the purpose of reflecting at least a part of the spectral region not cut out.

In accordance with the third exemplary embodiment represented in FIG. 5, the slit 42 of the slit diaphragm can be varied both in position and in dimension in accordance with the arrows 43, 44, as a result of which it is possible to cut out spectral regions which can be prescribed or set. The surfaces carrying the reflecting coating 41 can likewise be varied both in position and in angular position, as a result of which the reflected spectral region can likewise be influenced.

With regard to the arrangement of light-absorbing regions or of light traps, as well as with regard to the prevention or reduction of scattered light, reference is made to the summary for the purpose of avoiding repetitions.

With regard to the embodiment represented in FIG. 5, it may be pointed out further by way of addition that the means 27 for the spectral decomposition of the beam of light 14 and the means 28 for cutting out a first spectral region 29 and/or for reflecting at least a part 30 of the spectral region not cut out can be varied in angular position and position relative to one another. This is indicated only by the arrow 45. The same holds for the means 28 and 33 for cutting out a spectral region 29 and 34, respectively, which is indicated by the arrow 46. Finally, in their position relative to the means 28, 33, the detectors (not shown in FIG. 5) can also change their angular position and position.

It may be pointed out again with emphasis that the device according to the invention which is represented in FIGS. 3, 4 and 5 and has been explained above can be used or arranged in the beam path of a fluorescence microscope 1 represented schematically in FIG. 1.

I claim:

1. A device for selection and detection of at least two spectral regions of a beam of light, the device comprising:
    a selection device including
        a spectral decomposition device to spectrally decompose the beam of light;
        an optical element, which receives spectrally decomposed light from the spectral decomposition device, to cut out a first spectral region from the decomposed light and to reflect, from a totally reflecting portion, at least a part of the decomposed light which is not cut out as reflected light; and
        a mechanism to variably move the optical element to vary the first spectral region; and
    a detection device to detect light in the first spectral region and to detect the reflected light.

2. A device as set forth in claim 1, wherein the detection device includes a first detector to detect light in the first spectral region and a second detector to detect the reflected light.

3. A device as set forth in claim 1, wherein the selection device further comprises a second optical element, which receives the reflected light, to cut out a second spectral region from the reflected light and to reflect at least a part of the reflected light which is not cut out as second reflected light.

4. A device as set forth in claim 3, wherein the detection device includes a first detector to detect light in the first spectral region and a second detector to detect light in the second spectral region.

5. A device as set forth in claim 1, wherein the mechanism varies an angular orientation of the optical element.

6. A device as set forth in claim 1, wherein the mechanism continuously varies an angular orientation of the optical element.

7. A device as set forth in claim 3, wherein the selection device further comprises a third optical element, which receives the second reflected light, to cut out a third spectral region from the second reflected light and to reflect at least a part of the second reflected light which is not cut out as third reflected light.

8. A device as set forth in claim 1, wherein the spectral decomposition device includes a prism.

9. A device as set forth in claim 1, wherein the spectral decomposition device includes an optical grating.

10. A device as set forth in claim 1, wherein the spectral decomposition device includes a hologram.

11. A device as set forth in claim 8, further comprising pivots such that the prism is pivotable about an axis orthogonal to an incident beam of light.

12. A device as set forth in claim 9, further comprising pivots such that the optical grating is pivotable about an axis orthogonal to an incident beam of light.

13. A device as set forth in claim 10, further comprising pivots such that the hologram is pivotable about an axis orthogonal to an incident beam of light.

14. A device as set forth in claim 1, wherein the mechanism variably moves the optical element in a continuous manner.

15. A device as set forth in claim 1, wherein the optical element includes light traps.

16. A device as set forth in claim 1, further comprising a second mechanism to vary a relative position between the spectral decomposition device and the optical element.

17. A device as set forth in claim 1, further comprising a mechanism to vary a relative angular orientation between the spectral decomposition device and the optical element.

18. A device as set forth in claim 3, further comprising a mechanism to vary a relative position between the optical element and the second optical element.

19. A device as set forth in claim 1, further comprising a mechanism to vary a relative position between the optical element and the detection device.

20. A device as set forth in claim 1, further comprising a mechanism to vary a relative angular orientation between the optical element and the detection device.

21. A device as set forth in claim 1, wherein the selection device further comprises a second optical element, which receives the reflected light, to cut out a second spectral region from the reflected light.

22. A device as set forth in claim 15, wherein the mechanism variably moves the optical element in a continuous manner.

23. A device as set forth in claim 15, wherein the mechanism variably moves an angular orientation of the optical element in a continuous manner.

24. A confocal microscope, comprising:
a light source to generate a beam of light;
a scanner to scan an object with the beam of light; and
a device for selection and detection of at least two spectral regions of light from the object, the device including
a selection device including
a spectral decomposition device to spectrally decompose the light from the object;
an optical element, which receives spectrally decomposed light from the spectral decomposition device, to cut out a first spectral region from the decomposed light and to reflect, from a totally reflecting portion, at least a part of the decomposed light which is not cut out as reflected light; and
a mechanism to variably move the optical element to vary the first spectral region; and
a detection device to detect light in the first spectral region and to detect the reflected light.

25. A confocal microscope as set forth in claim 24, wherein the detection device includes a first detector to detect light in the first spectral region and a second detector to detect the reflected light.

26. A confocal microscope as set forth in claim 24, wherein the selection device further comprises a second optical element, which receives the reflected light, to cut out a second spectral region from the reflected light and to reflect at least a part of the reflected light which is not cut out as second reflected light.

27. A confocal microscope as set forth in claim 26, wherein the detection device includes a first detector to detect light in the first spectral region and a second detector to detect light in the second spectral region.

28. A confocal microscope as set forth in claim 24, wherein the mechanism varies an angular orientation of the optical element.

29. A confocal microscope as set forth in claim 24, wherein the mechanism continuously varies an angular orientation of the optical element.

30. A confocal microscope as set forth in claim 26, wherein the selection device further comprises a third optical element, which receives the second reflected light, to cut out a third spectral region from the second reflected light and to reflect at least a part of the second reflected light which is not cut out as third reflected light.

31. A confocal microscope as set forth in claim 24, wherein the spectral decomposition device includes a prism.

32. A confocal microscope as set forth in claim 24, wherein the spectral decomposition device includes an optical grating.

33. A confocal microscope as set forth in claim 24, therein the spectral decomposition device includes a hologram.

34. A confocal microscope as set forth in claim 31, further comprising pivots such that the prism is pivotable about an axis orthogonal to an incident beam of light.

35. A confocal microscope as set forth in claim 32, further comprising pivots such that the optical grating is pivotable about an axis orthogonal to an incident beam of light.

36. A confocal microscope as set forth in claim 33, further comprising pivots such that the hologram is pivotable about an axis orthogonal to an incident beam of light.

37. A confocal microscope as set forth in claim 24, wherein the mechanism variably moves the optical element in a continuous manner.

38. A confocal microscope as set forth in claim 24, wherein the optical element includes light traps.

39. A confocal microscope as set forth in claim 24, further comprising a second mechanism to vary a relative position between the spectral decomposition device and the optical element.

40. A confocal microscope as set forth in claim 24, further comprising a mechanism to vary a relative angular orientation between the spectral decomposition device and the optical element.

41. A confocal microscope as set forth in claim 26, further comprising a mechanism to vary a relative position between the optical element and the second optical element.

42. A confocal microscope as set forth in claim 24, further comprising a mechanism to vary a relative position between the optical element and the detection device.

43. A confocal microscope as set forth in claim 24, further comprising a mechanism to vary a relative angular orientation between the optical element and the detection device.

44. A confocal microscope as set forth in claim 24, wherein the selection device further comprises a second optical element, which receives the reflected light, to cut out a second spectral region from the reflected light.

45. A confocal microscope as set forth in claim 38, wherein the mechanism variably moves the optical element in a continuous manner.

46. A confocal microscope as set forth in claim 38, wherein the mechanism variably moves an angular orientation of the optical element in a continuous manner.

* * * * *